United States Patent [19]

Sorlie et al.

[11] 4,043,281
[45] Aug. 23, 1977

[54] DUAL PACKER WHEEL UNIT FOR TILLAGE APPARATUS

[75] Inventors: Donald Thomas Sorlie, Ankeny; David Hoffer Bucher, Des Moines, both of Iowa

[73] Assignee: Deere & Company, Moline, Ill.

[21] Appl. No.: 649,280

[22] Filed: Jan. 15, 1976

[51] Int. Cl.$^2$ ............................................. A01C 5/04
[52] U.S. Cl. ...................................... 111/85; 111/87; 172/519; 172/538
[58] Field of Search ................... 111/1, 17, 22, 60, 62, 111/69, 85, 86, 52, 66, 87, 14, 88; 172/19, 518, 519, 538, 536, 557, 671, 674, 669, 548, 574, 47, 398, 697, 60, 556, 609

[56] References Cited

U.S. PATENT DOCUMENTS

| 779,143 | 1/1905 | Van Brunt | 172/538 |
|---|---|---|---|
| 1,021,379 | 3/1912 | Schutt | 111/62 |
| 1,233,760 | 7/1917 | Dickinson | 111/62 |
| 2,070,830 | 2/1937 | Gravely | 172/556 X |
| 3,108,552 | 10/1963 | Watson et al. | 111/52 |
| 3,611,956 | 10/1971 | Moore et al. | 111/62 |
| 3,749,035 | 7/1973 | Cayton et al. | 111/85 |

FOREIGN PATENT DOCUMENTS

| 109,659 | 5/1968 | Denmark | 111/85 |
|---|---|---|---|
| 261,793 | 1/1970 | U.S.S.R. | 111/85 |

OTHER PUBLICATIONS

Operator's Manual OM-M15-654 "John Deere-Van Brunt Fertilizer-Grain Drill Model FB-A" John Deere Co.

*Primary Examiner*—Edgar S. Burr
*Assistant Examiner*—James R. Feyrer

[57] ABSTRACT

A dual packer unit is disclosed that is particularly useful for sod seeding purposes. The apparatus includes an H-shaped mounting bracket consisting of an arcuate leg connected at opposite ends to a pivot arm and a wheel mounting arm. The pivot arm is integrally formed with one end of the arcuate leg at the central portion of the pivot arm, and the wheel mounting arm is integrally formed with the other end of the arcuate leg at the central portion of the wheel mounting arm so that the ends of the pivot arm may be pivotally mounted between a pair of seed tubes, and packer wheels may be mounted for free rotation at the ends of the wheel mounting arms. When so mounted, each packer wheel is received in a furrow immediately following and in line with the seed tube. The packer wheels are gravity biased downwardly toward a cut furrow, and the unit therefore provides sufficient flexibility to follow the contour of the ground and to follow the cut furrow regardless of the depth selected.

8 Claims, 3 Drawing Figures

DUAL PACKER WHEEL UNIT FOR TILLAGE APPARATUS

FIELD OF THE INVENTION

This invention relates to a dual packer wheel unit, and, more particularly, relates to a dual packer wheel unit for a tillage apparatus.

BACKGROUND OF THE INVENTION

The use of tillage apparatus is well known, and various types of apparatus have been developed that are useful for one or more tasks.

As such apparatus has been developed and utilized, it has become evident that such apparatus could be improved, particularly for the many different tasks to be accomplished. It has been discovered, for example, that conventional tillage apparatus, such as disc harrows, disc cultivators and rotary hoes, have not proved to be entirely suitable for preparing ground for seeding where legumes are to be grown in established grass sod.

For growing legumes in established grass sod, the ground surface is often uneven or rocky and may have grass swards of differing thicknesses thereon. To prepare such ground for seeding or grassland renovation, it is desirable that the number of trips that an implement must make over such ground be held to a minimum in order to accomplish such tasks as tilling, seeding, cultipacking and spraying of herbicides. Hence, an implement capable of performing all of the various tasks in succession during a single pass over the ground was needed.

Such an implement would preferably be towed, since this allows the tillage apparatus to be disconnected from the tractor in order to release the tractor for other uses, and, when towed, the engine of the towing tractor is commonly utilized for power, as shown, for example, by the patent to Kaller, U.S. Pat. No. 2,957,529.

Responding to this need, apparatus has heretofore been developed having the capability for opening a furrow, depositing seed in the furrow, packing the seed and spraying chemicals on the planted area. Examples of such apparatus for carrying out some or all of the various tasks can be found, for example, in U.S. Pat. Nos. 2,685,243; 2,734,439; 3,491,709; 3,566,813; 3,568,613; 3,604,515; 3,611,956; 3,673,970; 3,701,327; 3,749,035 and 3,866,552.

Cutting of the sward and sod mat and provision of a furrow therein has, however, proved to be a continuing problem, at least in some instances, as well as the problem of packing the seed.

While packer wheel assemblies have heretofore been known and suggested, such assemblies have not been completely suitable for all applications, including providing a dual packer wheel unit and/or a unit providing satisfactory flexibility over the contour of the ground regardless of the depth of a cut furrow.

SUMMARY OF THE INVENTION

This invention provides an improved dual packer wheel unit for a tillage apparatus that is well suited to provide the needed flexibility to follow the contour of the ground and be received in a cut furrow regardless of the depth of the furrow.

It is therefore an object of this invention to provide an improved dual packer wheel unit.

It is another object of this invention to provide an improved packer wheel for a tillage apparatus.

It is yet another object of this invention to provide an improved packer wheel unit providing for pivoting of the packer wheels.

It is yet another object of this invention to provide an improved dual packer wheel unit providing for flexibility of the packer wheel to follow the contour of the ground and to be received in a cut furrow regardless of the depth of the furrow.

It is still another object of this invention to provide an improved dual packer wheel unit that includes an H-shaped mounting bracket.

It is yet another object of this invention to provide an improved dual packer wheel unit having a mounting bracket that includes two packer wheels to be biased toward a pair of spaced cut furrows.

With these and other objects in view, which will become apparent to one skilled in the art as the description proceeds, this invention resides in the novel construction, combination, and arrangement of parts substantially as hereinafter described, and more particularly defined by the appended claims, it being understood that changes in the precise embodiment of the hereindisclosed invention are meant to be included as coming within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
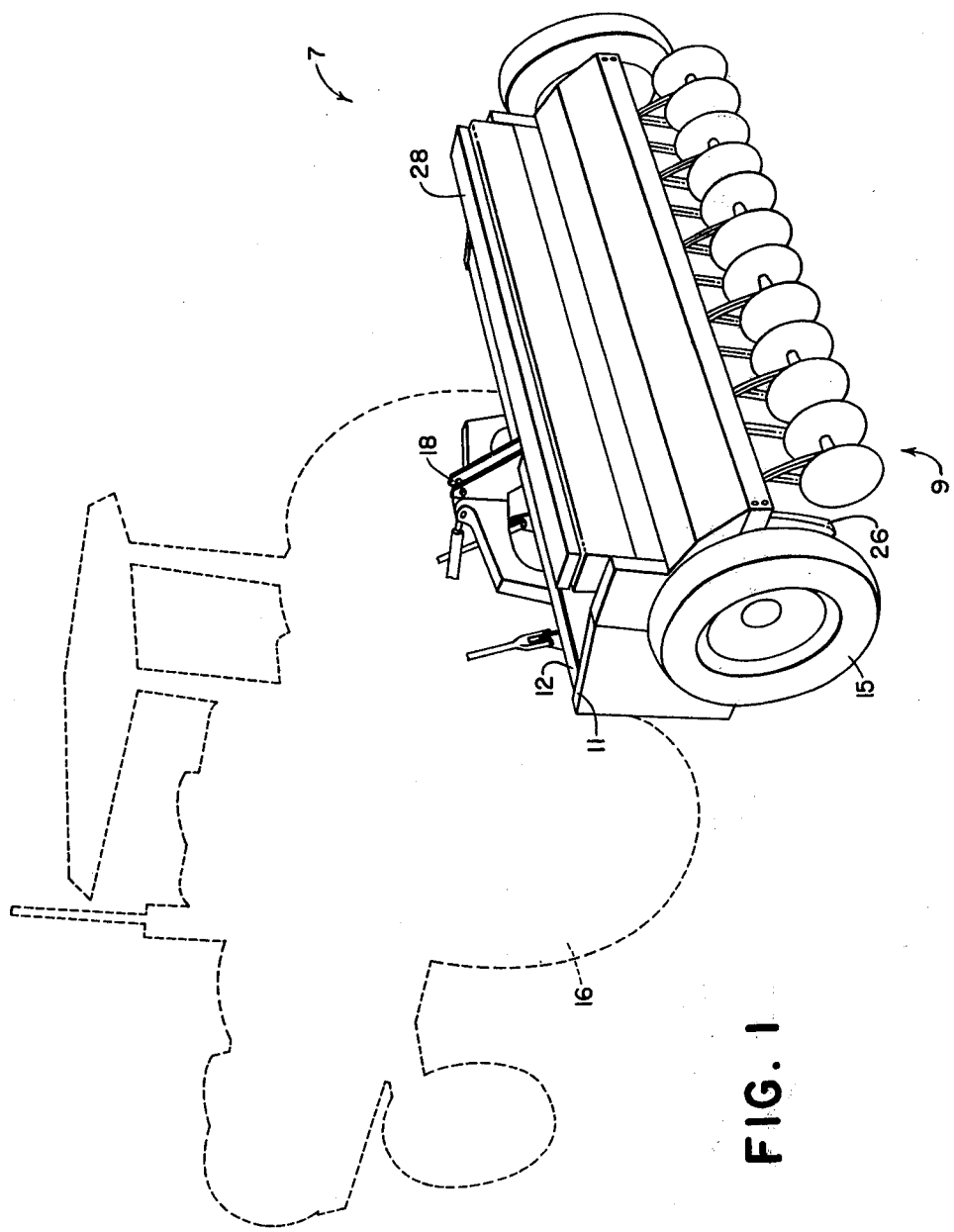
FIG. 1 is a perspective view of the tillage apparatus having the improved dual packer wheel unit of this invention mounted thereon.
Figure 2:
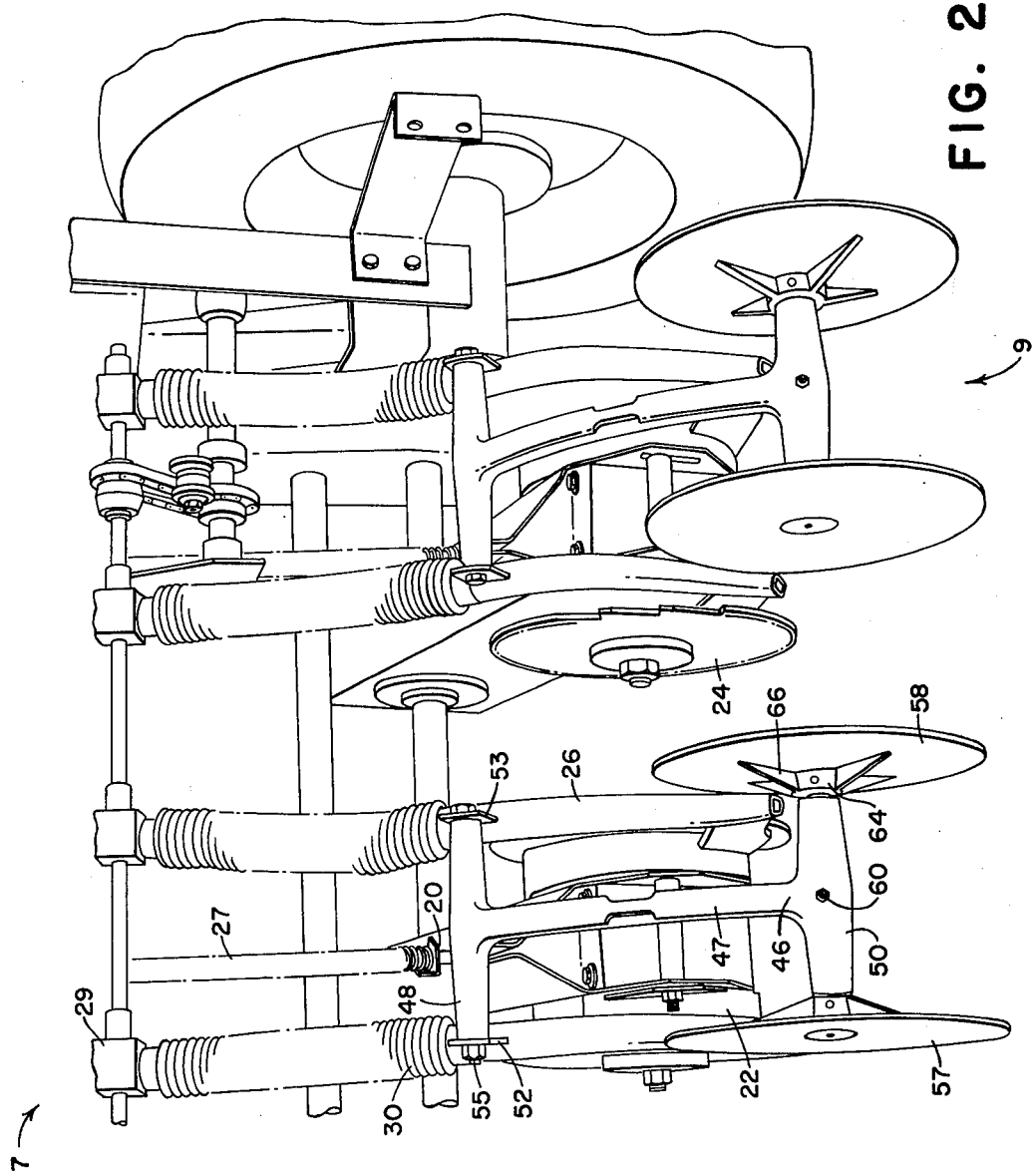
FIG. 2 is a perspective view of the packer wheel assembly as shown in FIG. 1 but showing the relation of the packer wheels to the cutter wheel and seed tube.

Referring now to the drawings, FIGS. 1 and 2 show a tillage apparatus 7 that includes the improved dual packer wheel unit 9 of this invention mounted thereon. As shown, apparatus 7 conventionally includes a tool bar or frame means 11 with one or more elongated members 12 (having cross braces 14 in suitable locations for a plurality of elongated members). Gauge wheels 15 mounted on the frame means may also be provided. A tractor 16 is provided to tow the apparatus (or, alternately, it could be self-propelled, if desired) and power from the tractor is conventionally coupled to the apparatus, as, for example, through shafts connected through universal joints between the power takeoff of the tractor and gear box mounted on the apparatus. When towed, the apparatus is conventionally attached to a tractor as by the conventional three-point hitch 18 as indicated in FIG. 1.

As is shown in FIG. 2, the frame means supports a plurality of pivoted arms 20, each of which is connected to one or more skids 22. One or more cutter wheels 24 are mounted on each arm 20 so as to be associated with a skid 22, and a seed boot 26 is mounted on each skid adjacent to and rearwardly of each cutter wheel 24. Each cutter wheel arm is preferably biased downwardly, as by spring 27, to urge the skid into ground contact during movement of the apparatus by the tractor (when towed). Seed boots 26 are connected to a seed hopper 28 through seed metering unit 29 and tubing 30. As shown, the packer wheel assembly 9 of this invention is mounted rearwardly of skid 22, so that the packer wheel assembly follows the furrow cut by the cutter wheel and packs seed therein.

The foregoing structure has been only briefly discussed herein to the extent deemed necessary to provide a structural setting to better explain the improvement of this invention. The overall combination of a cutter, seeding tube and packer is shown, for example, in U.S. Pat. Nos. 3,611,956; 3,749,035 and 3,866,552 and may be referred to for a more complete general description.

Figure 3:
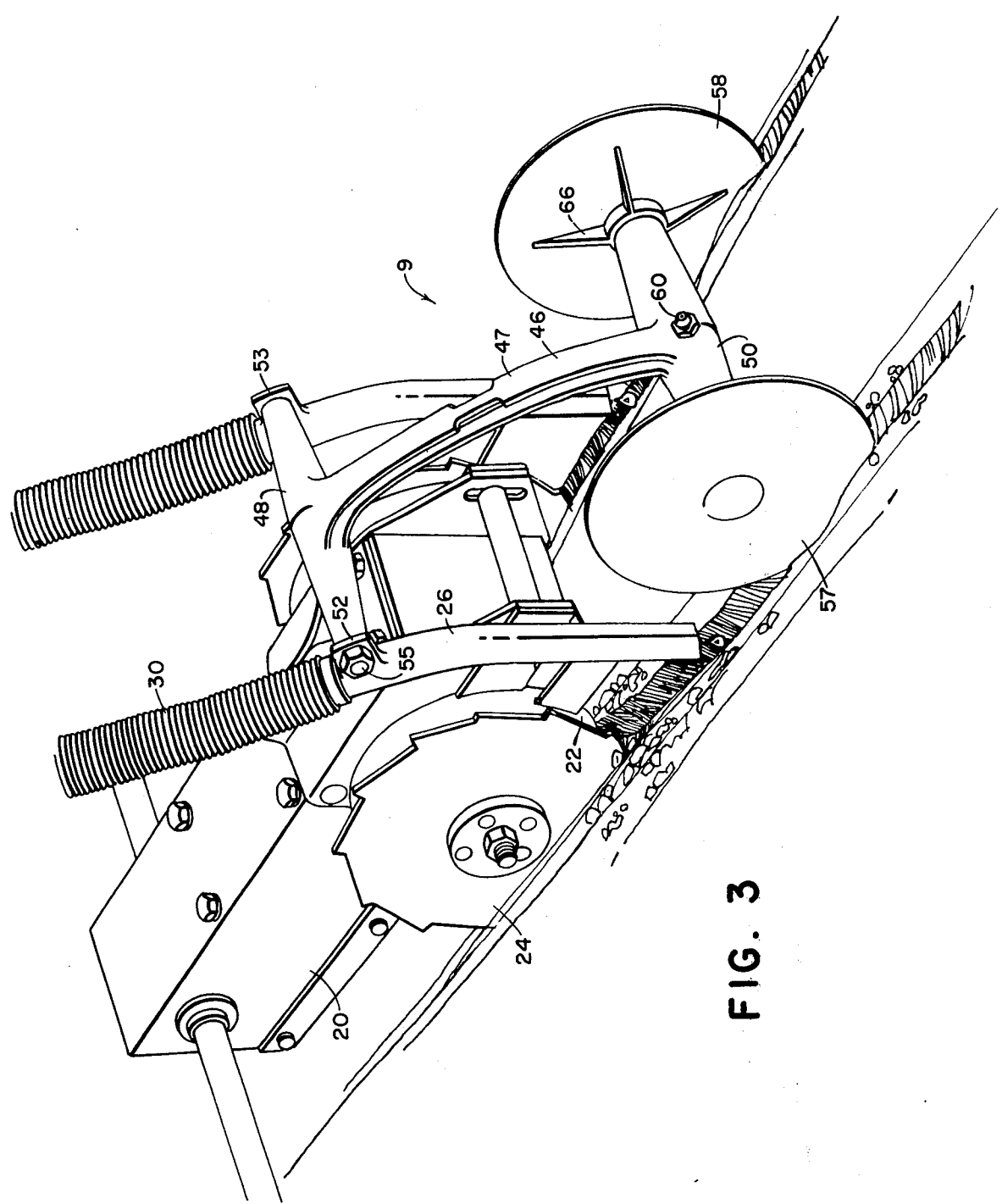
FIG. 3 is a perspective view of a single packer wheel unit as shown in FIGS. 1 and 2.

As can be seen in FIGS. 2 and 3, dual packer wheel unit 9 includes a substantially H-shaped mounting bracket 46 that includes an arcuate leg 47 connected at opposite ends to arms 48 and 50. Arms 48 and 50 are preferably integrally formed at the central portion with the opposite ends of legs 47. As indicated, arms 48 and 50 have a circular cross section and taper in diameter near the opposite ends, while leg 47 is an I beam (or, alternately, a T beam). The midportion of leg 47 is adapted to have one end of a chain (not shown) connected thereto, which chain pulls the packer wheel out of ground engagement when a tillage apparatus is pulled out of ground engagement by an operator on the towing vehicle.

Pivot tabs 52 and 53 extend from the seed tubes, and a pivot rod 55 extends through pivot arm 48 and apertures in tabs 52 and 53 to mount the bracket 46 to pivot about a horizontal axis. Wheel mounting arm 50 has an axle therethrough so that packer wheel 57 and 58 may be mounted at opposite ends for free rotation. A grease fitting 60 may be mounted at the central portion of the arm 50 as desired.

The packer wheels are thus spaced, as shown best in FIG. 2, a distance equal to that between the furrows cut by the cutter wheels, and the packer wheels are gravity-biased downwardly so that the periphery of the packer wheels are received in the furrows cut by the cutter wheels. Leg 47 is of sufficient length so that the packer wheels follow the seed tubes and have the flexibility to be able to follow the contour of the ground. While not mandatory, it has been found that the packer wheels can be plastic, while the mounting bracket is preferably of metal.

The packer wheels are preferably about ten inches in diameter and have a central hub 64 for mounting the packer wheels on the packer wheel axle extending through arm 50 of the mounting bracket, and hub 64 may have strengthening ribs 66 extending radially outwardly therefrom and attached to the inner side of the packer wheel. The packer wheels, being gravity biased toward the ground, are configured such that preferably the packer wheels exert about ten psi pressure when in ground contact.

In operation, the dual packer wheel unit follows the contour of the ground and is received in a cut furrow, with the periphery of the packer wheels being at the bottom of the cut furrow regardless of the depth of the furrow. With furrows spaced eight inches apart, for example, the packer wheels will, of course, be likewise spaced eight inches apart, so that each packer wheel is received in the bottom of each cut furrow.

As can be seen from the foregoing, this invention provides an improved dual cutter wheel unit that is particularly useful for tillage apparatus. Hence, the invention is not to be considered as being limited to the particular details given, nor to the specific application to which reference has been made during the description of the apparatus, except insofar as may be required by the scope of the appended claims.

What is claimed is:

1. In a tillage unit having a pair of transversely spaced and driven cutter wheels capable of engaging and cutting a pair of spaced furrows and a pair of transversely spaced seed delivery tubes for discharging seed in the respective furrows, the improvement residing in a dual packer wheel assembly, comprising:

bracket means including an arcuate leg connected at opposite ends to the central portion of a pair of substantially equal length arms, one of which is connected at opposite ends to spaced pivot points on the respective tubes and the other of which is a packer wheel mounting arm; and a pair of packer wheels mounted for free rotation at the opposite ends of said packer wheel mounting arm, whereby said wheels are spaced apart a distance sufficient to follow and be received in the spaced furrows cut by said tillage unit, said wheels being narrower than the respective furrows so that each rides on the bottom of the furrow.

2. In a tillage unit having a pair of transversely spaced and driven cutter wheels capable of engaging and cutting a pair of spaced furrows and similarly spaced seed delivery tubes for discharging seed in the respective furrows, the improvement residing in a dual packer wheel assembly, comprising:

a substantially H-shaped bracket means having a leg portion and a pair of substantially equal length arm portions, and being connected directly to the delivery tube; a pair of packer wheels mounted at opposite ends of the rear most one of said arm portions on said bracket means; and packer wheel pivot means connected to the front most arm portion of said bracket means and between the latter and the delivery tubes, whereby said packer wheels are pivoted to follow in the pair of spaced furrows cut by said tillage unit, said packer wheels being narrower than said furrows.

3. The dual packer wheel assembly of claim 2, wherein said leg portion of said bracket is arcuate, and wherein said arm portions are integrally formed with the opposite ends off said leg portion.

4. The dual packer wheel assembly of claim 2, wherein said delivery tubes includes spaced pivot means, and wherein said other arm portion of said bracket is mounted between said pivot means to pivot said bracket means about a horizontal axis.

5. The dual packer wheel assembly of claim 2, wherein said packer wheels are of plastic, and said bracket means is of metal.

6. The dual packer wheel assembly of claim 2, wherein said packer wheels exert a normal force on the bottom of a cut furrow of about 10 psi.

7. The dual packer wheel assembly of claim 2, wherein said packer wheel pivot means is connected to the top portion of said seed tubes.

8. The dual packer wheel assembly of claim 2, wherein said tillage unit includes a plurality of pairs of furrow-forming and seeding units, and wherein a dual packer wheel assembly is provided for each pair of said furrow-forming and seeding units.

* * * * *